United States Patent
Kim

(10) Patent No.: US 6,776,969 B2
(45) Date of Patent: Aug. 17, 2004

(54) GAS SCRUBBER WITH AUTOMATIC DISASSEMBLING DEVICE

(75) Inventor: Dong-Soo Kim, Inchon (KR)

(73) Assignee: Korea M.A.T. Co., Ltd., Kyunggi-do (KR)

( * ) Notice: Subject to any disclaimer, the term of this patent is extended or adjusted under 35 U.S.C. 154(b) by 714 days.

(21) Appl. No.: 09/819,842

(22) Filed: Mar. 28, 2001

(65) Prior Publication Data

US 2002/0048538 A1 Apr. 25, 2002

(30) Foreign Application Priority Data

Oct. 24, 2000 (KR) .......................................... 2000-62565

(51) Int. Cl.[7] .......................... B01D 53/00; B01D 50/00
(52) U.S. Cl. ....................... 422/171; 422/168; 422/169; 422/170
(58) Field of Search ............................... 422/168–172, 422/177

(56) References Cited

U.S. PATENT DOCUMENTS 5,997,824 A * 12/1999 Kim .......................... 422/171
6,544,483 B1 * 4/2003 Kim .......................... 422/177

* cited by examiner

Primary Examiner—Hien Tran
(74) Attorney, Agent, or Firm—Wood, Herron & Evans, L.L.P.

(57) ABSTRACT

A gas scrubber with an automatic disassembling device in accordance with the present invention comprises a burning chamber to treat the gas with heat, a wetting chamber connected to the burning chamber for removing water soluble components contained in the gas flowing in from the burning chamber, an outlet which exhausts gas that has been treated, and a housing that contains both the burning chamber and the wetting chamber, wherein said wetting chamber slides out of the housing along guide rails placed at the bottom side edges of the wetting chamber. The bottom back edge of the burning chamber is connected to the top back edge of the wetting chamber with a hinge and a pivot member is placed on both sides of the burning chamber so that when the wetting chamber slides out along the guide rail to the outside to the housing, the burning chamber rotates about 90 degrees in the inside of the housing.

5 Claims, 6 Drawing Sheets

GAS SCRUBBER WITH AUTOMATIC DISASSEMBLING DEVICE

This application claims the priority of Korean Patent Application No. 2000-62565 filed Oct. 24, 2000, the disclosure of which is hereby fully incorporated by reference herein.

TECHNICAL FIELD

This invention relates to a gas scrubber for treating gas generated during the manufacture of semiconductor devices and, more particularly to a gas scrubber with an automatic disassembling device.

BACKGROUND

Since a gas exhausted from the semiconductor manufacturing device contains a high degree of the toxic components, it must be purified before exhausted to atmosphere. As illustrated in FIG. 1, a gas scrubber comprises an intake 1 where gas flows in to a gas scrubber, a burning chamber 3 to treat the gas with heat, a wetting chamber 5 which removes water soluble components contained in the gas flowing in from a burning chamber 3, and an outlet which exhausts gas that has been treated.

A gas scrubber related to the present invention is explained in detail in U.S. Pat. No. 5,997,824.

The above-described gas scrubber requires periodic cleaning of the burning chamber and the wetting chamber due to powder buildup resulting from the treatment of toxic gasses. In order to clean the burning chamber and the wetting chamber of the gas scrubber, the gas scrubber must be disassembled.

The construction of conventional gas scrubbers does not facilitate the disassembly of components so that the burning chamber and wetting chamber may be cleaned, making the cleaning process inconvenient.

SUMMARY

Accordingly, it is an object of the present invention to resolve the foregoing problems of conventional gas scrubbers by providing a gas scrubber with an automatic disassembling device, comprising a burning chamber to treat the gas with heat, a wetting chamber connected to the burning chamber for removing water soluble components contained in the gas flowing in from the burning chamber, an outlet which exhausts the gas that has been treated, and a housing that contains both the burning chamber and the wetting chamber. The wetting chamber slides out of the housing along guide rails placed at the bottom side edges of the wetting chamber. The bottom back edge of the burning chamber is connected to the top back edge of the wetting chamber with a hinge and a pivot member placed on both sides of the burning chamber so that when the wetting chamber slides out along the guide rails to the outside of the housing. The burning chamber rotates about 90 degrees in the inside of the housing.

Other objects are satisfied by a gas scrubber with an automatic disassembling device comprising a pair of screws attached to the back of the wetting chamber for moving the wetting chamber out of the housing when it is unscrewed and moving the wetting chamber into the inside of the housing when it is screwed into the wetting chamber.

Other objects are satisfied by a gas scrubber with an automatic disassembling device comprising motors placed at the back of the housing and connected to the screws to rotate the screws, whereby movement of the wetting chamber is controlled via control of the motors.

DESCRIPTION OF THE PREFERRED EMBODIMENT

Figure 1:
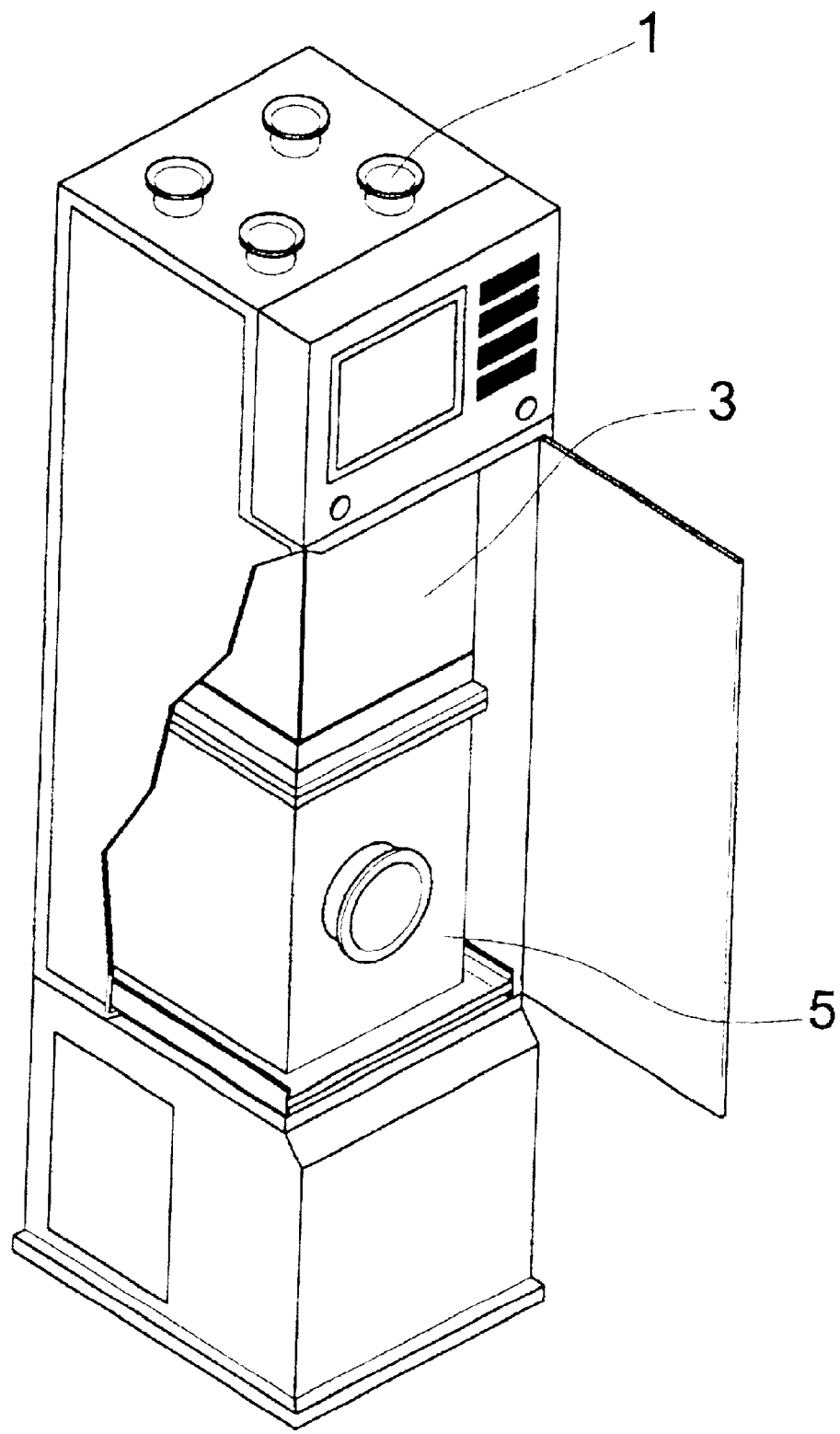
FIG. 1 is a partial sectional view of the conventional gas scrubber.
Figure 2:
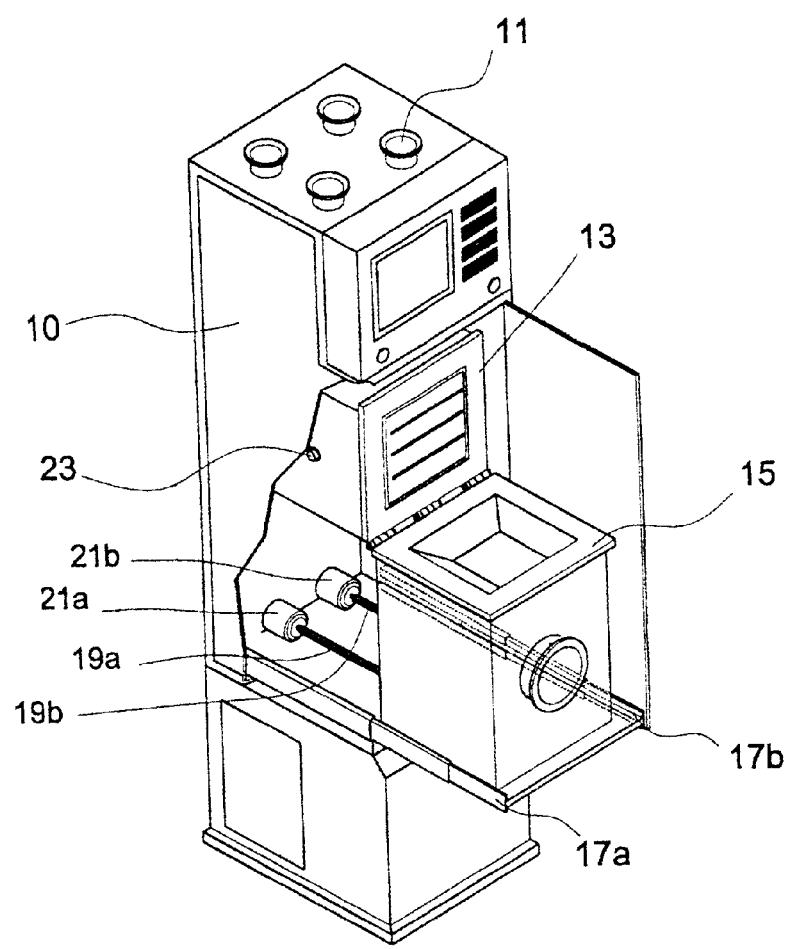
FIG. 2 is a partial sectional view of the automatic disassembling gas scrubber in accordance with the present invention.

Referring to FIG. 2, a gas scrubber in accordance with the present invention also comprises an intake 11 where gas flows in, a burning chamber 13 connected to the intake 11 to treat the gas by applying heat, a wetting chamber 15 which removes water soluble components contained in the gas flowing in from burning chamber 13, an outlet which exhausts gas that has been treated, and a housing which houses both burning chamber 13 and wetting chamber 15.

Guide rails 17a, 17b are placed at the bottom of the left and right sides of the wetting chamber 15 such that the wetting chamber 15 slides freely in and out of the housing 10 along the guide rails 17a, 17b.

The back of the wetting chamber is connected to screws 19a, 19b which move the wetting chamber 15 out of the housing 10 when they are unscrewed and moves the wetting chamber 15 into the inside of the housing 10 when they are screwed into the wetting chamber 15. Motors 21a, 21b are placed at the back of the housing and connected to the screws 19a, 19b to rotate the screws 19a, 19b, thereby the movement of the wetting chamber is controlled by controlling motors 21a, 21b.

The wetting chamber 13 can also be moved manually by rotating the screws 17a, 17b manually. Other means that generate a horizontal movement can also be employed.

Figure 3A:
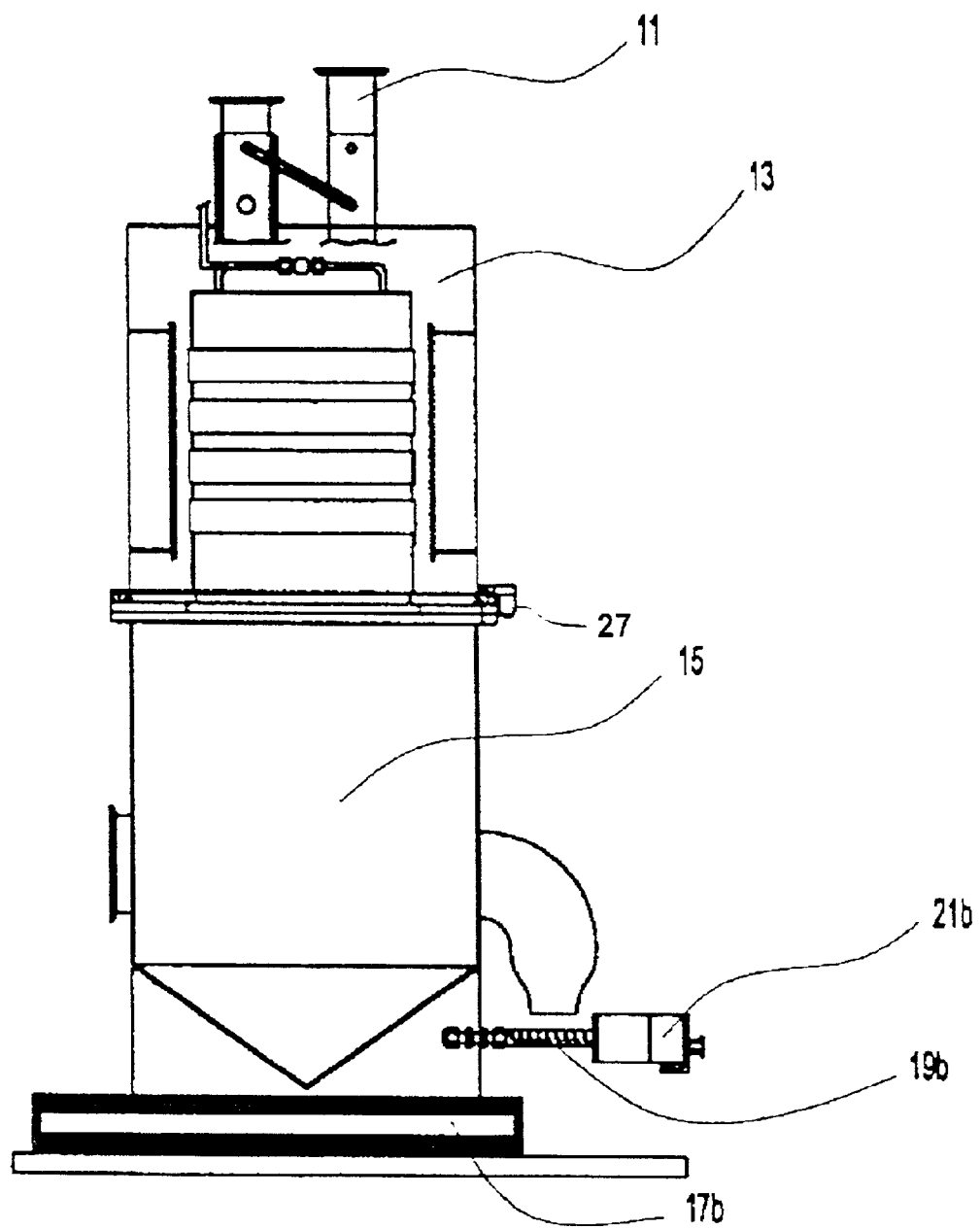
FIGS. 3a, 3b and 3c are perspective views illustrating the operation of the automatic disassembling gas scrubber in accordance with the present invention.
Figure 3B:
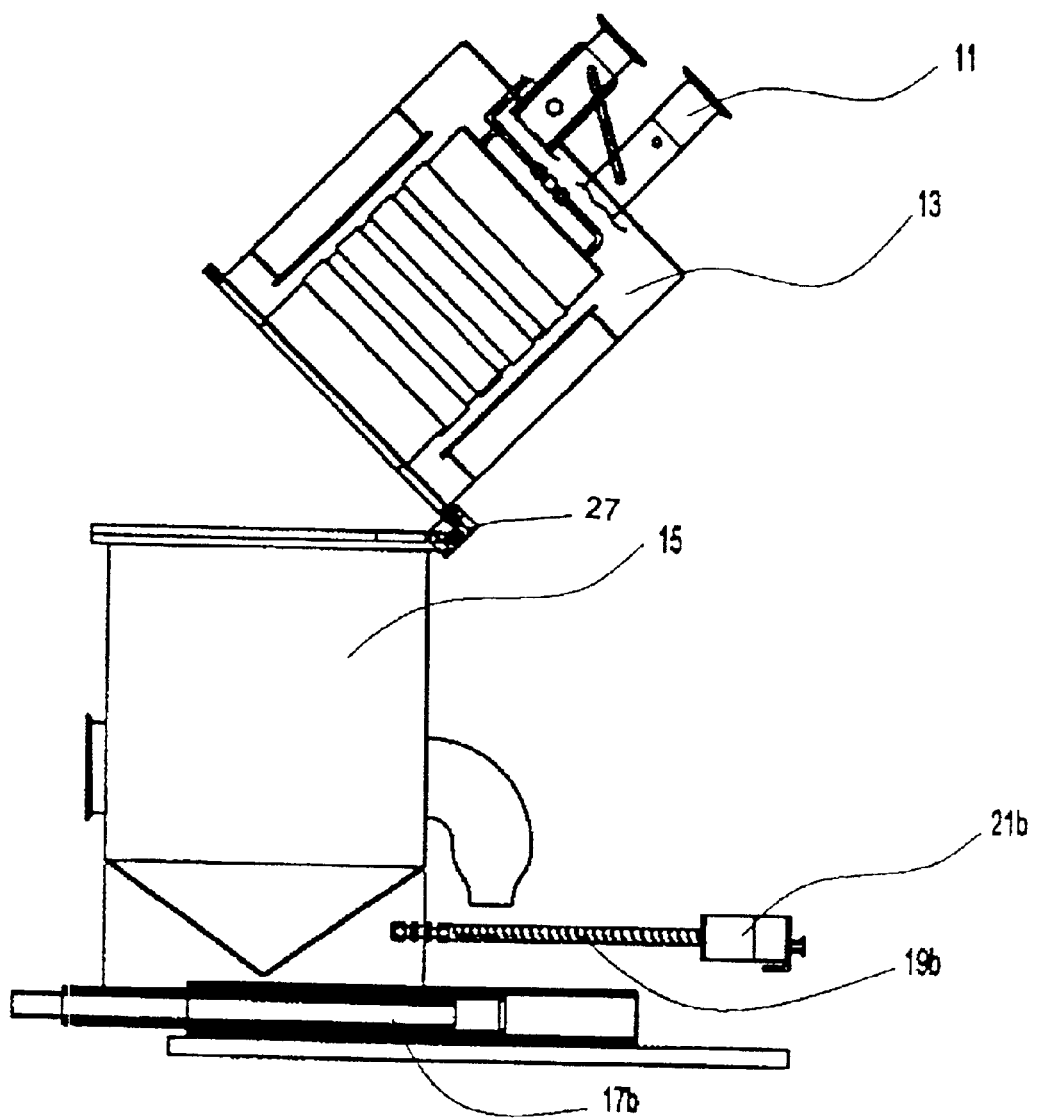
Figure 3C:
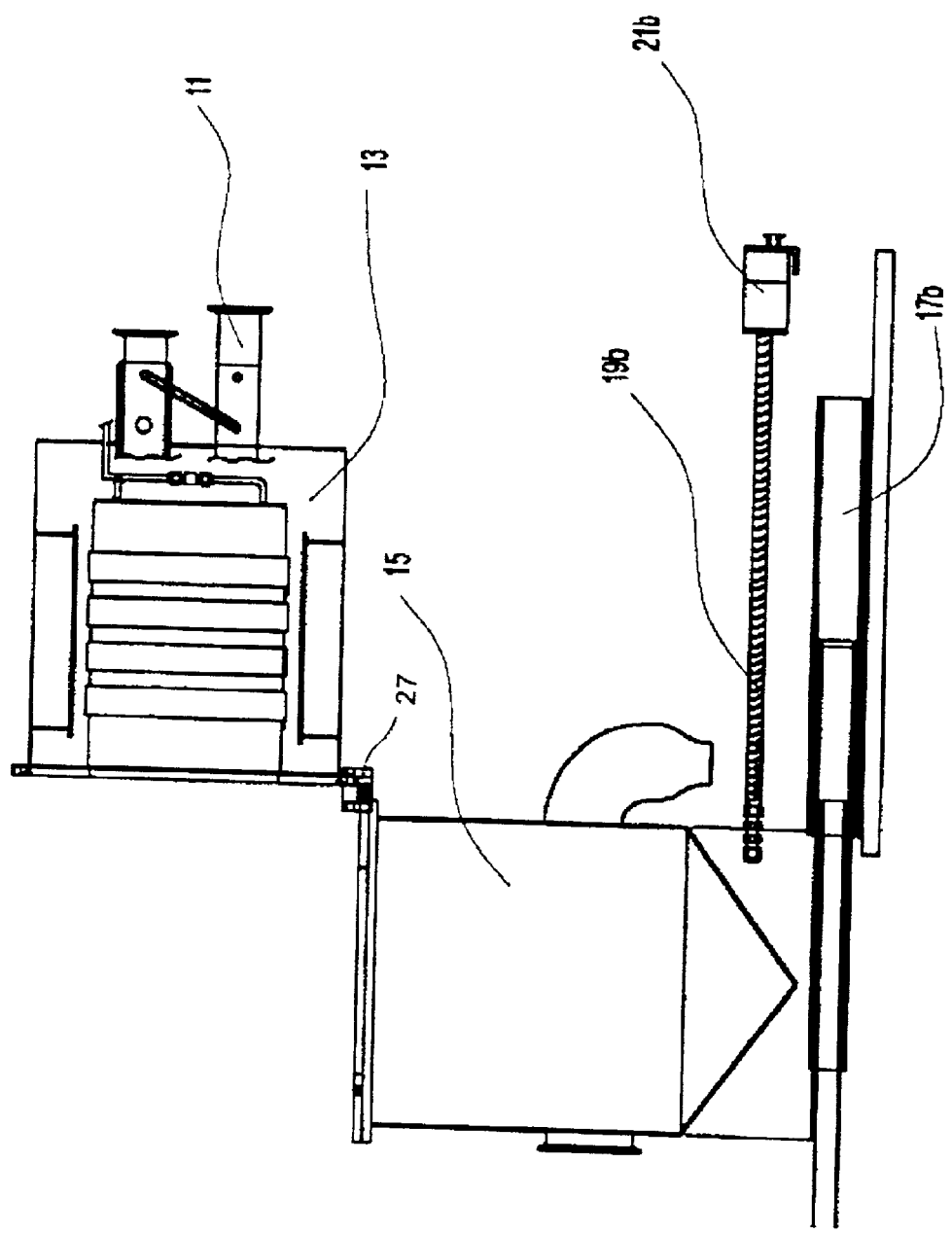

Referring to FIG. 3(a), the bottom back edge of the burning chamber 13 is connected to the back top edge of the wetting chamber 15 with a hinge 27 and a pivot member 23 (shown in FIG. 2) placed on both sides of the burning chamber 13 such that when the wetting chamber 15 slides out along the guide rail 17a, 17b to the outside to the housing 10, the burning chamber rotates about 90 degrees within the inside of the housing 10. FIGS. 3b and 3c illustrate the movement of the wetting chamber 15 and rotation of the burning chamber 13 in steps.

When the burning chamber 13 is rotating within the housing 10, it is preferred to use the least amount of space possible, and in order to do that a guide member 25 is formed at the inner sides of the housing 10 proximate pivot members 23 to guide pivot members 23 along a fixed route. It is possible to form a guide member 25 in many different shapes, however, a preferred shape of the guide member 25 is illustrated in FIG. 4. which achieves usage of least amount of a space possible.

Figure 4:
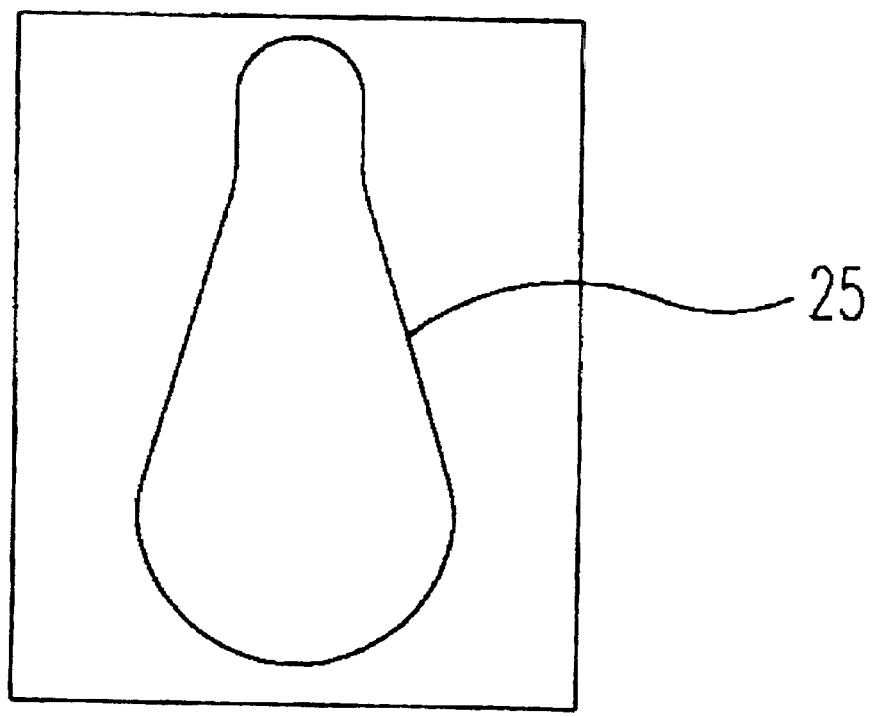
FIG. 4 is an elevation view of a guide member.

As shown in FIG. 4, the guide member in accordance with the present invention is a figure-eight pattern. When the pivot member 23 moves along the guide member 25 for a full cycle, the burning chamber 13 rotates 90 degrees, and when the pivot member 23 moves backwardly along the shape of the guide member 25 in one full cycle, the burning chamber 13 rotates back to a normal position.

Although a gas scrubber in accordance with the present invention works in the same manner as the conventional gas scrubber in treating the toxic gas, an automatic disassemble system of the present invention makes the periodic cleaning of the gas scrubber more convenient since the gas scrubber need not be taken apart manually.

When the front opening of the housing is opened and motors 21a, 21b are operated, the wetting chamber 13 slides out along guide rails 17a, 17b to the outside to the housing 10 by rotation of the screws 19a, 19b, simultaneously the burning chamber 13 connected to the wetting chamber 15 with a hinge 27 rotates in 90 degrees as the pivot member 23 moves along the shape of the guide 25.

Once the gas scrubber is disassembled, the burning chamber 13 is cleaned through the opening at the bottom, and the wetting chamber 15 is cleaned through the opening at the top. For convenience, the water gun used for providing water to the wetting chamber 15 for wetting process of the toxic gas treatment process may be used to clean the scrubber.

An automated disassemble system of the present invention makes a periodic cleaning of the gas scrubber in accordance with the present invention more convenient, thus the maintenance of the gas scrubber could be done more effectively.

Although the invention has been shown and described with respect to detailed embodiments thereof, it should be understood by those skilled in the art that various changes and omissions in form and detail may be made therein without departing from the spirit and the scope of the invention.

What is claimed is:

1. A gas scrubber with an automatic disassembling device comprising a burning chamber to treat the gas with heat, a wetting chamber connected to the burning chamber which removes water soluble components contained in the gas flowing in from the burning chamber, an outlet which exhausts gas that has been treated, and a housing that host both burning chamber and wetting chamber, and said wetting chamber slides out of the housing along guide rails placed at the bottom side edges of the wetting chamber, the bottom back edge of the burning chamber being connected to the top back edge of the wetting chamber with a hinge and a pivot member is placed on both sides of the burning chamber so that when the wetting chamber slides out along the guide rail to the outside to the housing, the burning chamber rotates about 90 degrees in the inside of the housing.

2. The gas scrubber with an automatic disassembling device according to claim 1 further comprising screws connected to the back of the wetting chamber, for moving the wetting chamber out of the housing when it is unscrewed and moving the wetting chamber into the inside of the housing when it is screwed into the wetting chamber.

3. The gas scrubber with an automatic disassembling device according to claim 1 further comprising motors placed at the back of the housing and connected to the screws to rotate the screws, whereby the movement of the wetting chamber is controlled via control of the motors.

4. The gas scrubber with an automatic disassembling device according to claim 1, wherein figure-eight shaped guide members are placed at the side of the inside of the housing, and pivot members move according to the shape of the guide member causing the burning chamber to rotate.

5. The gas scrubber with an automatic disassembling device according to claim 2, wherein figure-eight shaped guide members are placed at the side of the inside of the housing, and pivot members move according to the shape of the guide member causing the burning chamber to rotate.

* * * * *